US010076196B2

(12) United States Patent
Westbrooks

(10) Patent No.: US 10,076,196 B2
(45) Date of Patent: Sep. 18, 2018

(54) POT STAND WITH REMOVABLE WATER TRAY

(71) Applicant: Christopher James Westbrooks, Willis, MI (US)

(72) Inventor: Christopher James Westbrooks, Willis, MI (US)

( * ) Notice: Subject to any disclaimer, the term of this patent is extended or adjusted under 35 U.S.C. 154(b) by 138 days.

(21) Appl. No.: 14/988,189

(22) Filed: Jan. 5, 2016

(65) Prior Publication Data
US 2016/0198872 A1 Jul. 14, 2016

Related U.S. Application Data

(60) Provisional application No. 62/099,914, filed on Jan. 5, 2015.

(51) Int. Cl.
A47G 7/00 (2006.01)
A47G 7/02 (2006.01)
A01G 9/04 (2006.01)
A01G 9/08 (2006.01)

(52) U.S. Cl.
CPC ............... A47G 7/02 (2013.01); A01G 9/042 (2013.01); A01G 9/088 (2013.01)

(58) Field of Classification Search
CPC .......... A01G 9/042; A01G 9/045; A01G 9/04; A01G 9/1066; A01G 9/028; A01G 27/005; A01G 27/006; A47G 7/02; A47G 7/025; A47G 7/041
See application file for complete search history.

(56) References Cited

U.S. PATENT DOCUMENTS

| 1,487,231 | A | * | 3/1924 | George | A01G 9/02 47/39 |
| 1,808,402 | A | * | 6/1931 | Cooper | A01G 9/02 312/229 |
| 1,820,843 | A | * | 8/1931 | Spitz | A01G 9/04 248/129 |
| 2,022,591 | A | * | 11/1935 | Everitt | A47B 31/00 108/24 |
| 4,077,159 | A | | 3/1978 | Haglund | |
| 4,092,804 | A | | 6/1978 | Morris et al. | |
| 4,481,733 | A | | 11/1984 | Jacobs | |
| 4,638,595 | A | * | 1/1987 | Rivero | A01G 9/04 47/39 |
| 6,047,499 | A | | 4/2000 | Staas | |
| 6,385,899 | B1 | * | 5/2002 | Treganza | A47G 7/041 47/39 |
| 9,060,469 | B2 | * | 6/2015 | Kamon, II | A01G 17/04 |

(Continued)

FOREIGN PATENT DOCUMENTS

| CA | 2238914 A1 | 11/1999 |
| CN | 2403230 Y | 11/2000 |

(Continued)

Primary Examiner — Kristen C Hayes
(74) Attorney, Agent, or Firm — Vincent Re PLLC

(57) ABSTRACT

A device is disclosed including a pot stand configured to hold a plant within a pot. The device includes a first platform configured to hold the pot and to permit runoff water from the pot to drain through the first platform and a second platform rigidly attached below the first platform holding a removable runoff collection container collecting water from the first platform, wherein the runoff collection container is removable without moving the pot.

2 Claims, 4 Drawing Sheets

(56) References Cited

U.S. PATENT DOCUMENTS

| | | | |
|---|---|---|---|
| 9,474,214 B2 * | 10/2016 | Cudmore | A01G 9/023 |
| 2006/0032132 A1 | 2/2006 | Liffers et al. | |
| 2006/0168883 A1 | 8/2006 | Brutsche, III et al. | |
| 2008/0083163 A1 * | 4/2008 | Amsellem | A01G 9/042 47/66.6 |
| 2008/0141586 A1 * | 6/2008 | Hong | A01G 9/04 47/39 |
| 2009/0229180 A1 | 9/2009 | Rich et al. | |
| 2012/0255226 A1 | 10/2012 | Salen | |
| 2015/0007497 A1 * | 1/2015 | Delp, II | A01G 9/04 47/66.7 |
| 2015/0047258 A1 * | 2/2015 | Lewis | A01G 9/023 47/66.6 |

FOREIGN PATENT DOCUMENTS

| | | | | |
|---|---|---|---|---|
| CN | 2684553 Y | | 3/2005 | |
| DE | 202014103498 U1 * | | 8/2014 | B65F 1/14 |
| EP | 1951027 B1 | | 1/2008 | |
| GB | 189422439 A | | 11/1894 | |
| GB | 189421117 A | | 7/1895 | |
| WO | WO1988000006 A1 | | 1/1988 | |
| WO | WO1996013146 A1 | | 5/1996 | |

* cited by examiner

POT STAND WITH REMOVABLE WATER TRAY

CROSS REFERENCE TO RELATED APPLICATIONS

This disclosure claims the benefit of U.S. Provisional Application No. 62/099,914, filed on Jan. 5, 2015, which is hereby incorporated by reference.

TECHNICAL FIELD

This disclosure is related to an object for use in tending plants. In particular, the disclosure is related to a stand holding a pot above a removable tray, such that water can be poured through and monitored without moving the pot and disturbing the plant.

BACKGROUND

The statements in this section merely provide background information related to the present disclosure. Accordingly, such statements are not intended to constitute an admission of prior art.

Pots are used to grow a plant from a seed or a seedling to a full grown plant. Pots can be used by a person to grow a plant. Pots can be used by commercial pots or farmers to grow plants and either sell the plants or sell fruit or other harvest from the plants.

Plants require certain soil conditions and root conditions to be healthy. Soil content, pH level, and moisture content are among the many parameters within a pot that affect the health of a plant. A healthy plant with the right pot conditions can sell for a good market price or bear saleable fruit. An unhealthy plant can be a wasted effort and poor business for a pot or farmer. Further, methods to care for plants often include flushing the pot with water, and with known pots, this flushing can required that the person tending the plant has to life the plant out of the saucer and jostle the plant in the process or tip the pot over to prevent excess water from pooling around the roots of the plant.

SUMMARY

A device is disclosed including a pot stand configured to hold a plant within a pot. The device includes a first platform configured to hold the pot and to permit runoff water from the pot to drain through the first platform and a second platform rigidly attached below the first platform holding a removable runoff collection container collecting water from the first platform, wherein the runoff collection container is removable without moving the pot.

BRIEF DESCRIPTION OF THE DRAWINGS

One or more embodiments will now be described, by way of example, with reference to the accompanying drawings, in which.

DETAILED DESCRIPTION

A pot stand is disclosed including a first platform holding a potted plant and a second platform below the first platform holding a removable runoff collection container or saucer collecting water from the first platform. This disclosed pot stand is advantageous because a person tending to the plants can water the plants at will and simply remove the saucer when it becomes full with water. Additionally, the saucer and the water therewithin can be tested, for example, monitoring PPM levels and pH of an individual plant useful to diagnosing a state of the soil in the pot. Further the saucer can be removed without disturbing or jostling the plant. Having the plant elevated from the saucer also present another advantage as you can prevent over watering and keep the plants from absorbing salts and waste that could be present in the saucer. The disclosed pot stand is useful for tending to delicate or expensive plants that require particular soil properties. It is similarly useful in biological studies wherein testing of the effects of soil conditions upon the plant are particularly important. The disclosed system or device simulates an environment a plant in nature would experience where salts and waste can be naturally flushed away from the plant.

Figure 1:
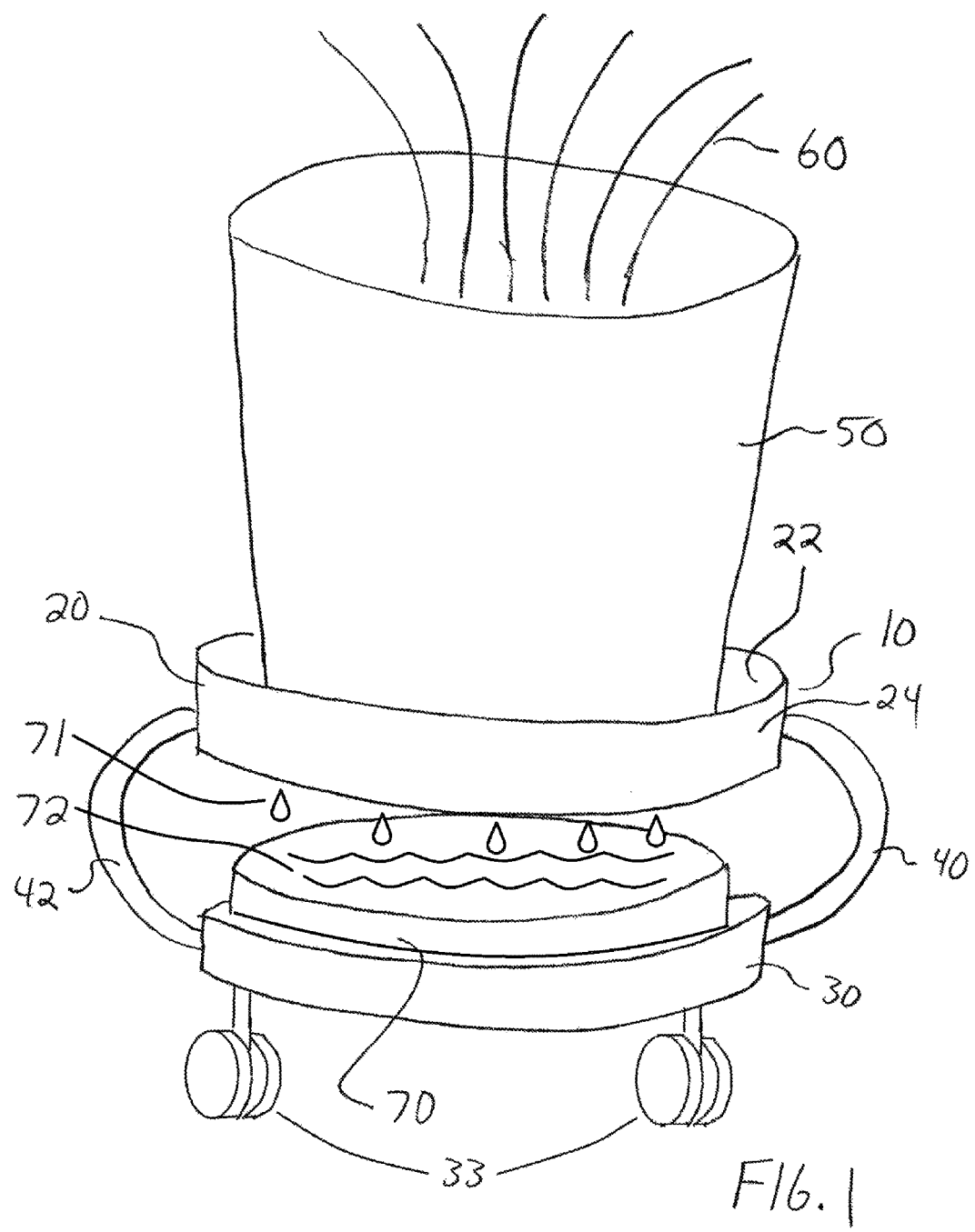
FIG. 1 illustrates an exemplary embodiment of a pot stand holding up a pot over a removable saucer, in accordance with the present disclosure.

Referring now to the drawings, wherein the showings are for the purpose of illustrating certain exemplary embodiments only and not for the purpose of limiting the same, FIG. 1 illustrates an exemplary embodiment of a pot stand holding up a pot over a removable runoff collection container or saucer. Pot stand 10 is illustrated including a first platform 20 and a second platform 30. Platform 30 and platform 20 are connected by exemplary arcuate supporting members 40 and 42. By bending out away from the space between platforms 20 and 30 the supporting member 40 and 42 provide ample space between the platforms to position and remove saucer 70 supported by platform 30. Platform 30 includes optional wheels 33 enabling a user to easily move the pot stand 10 from one location to another. Exemplary platform 20 includes cavity 22 created by a cylindrical wall section 24 around the perimeter of platform 20. This is an exemplary configuration and includes a benefit of the wall section 24 holding pot 50 in place and keeping the pot from sliding off the side of pot stand 10. Pot 50 holds plant 60 and soil to contain roots of plant 60. Pot 50 includes a structural feature such as holes or slits near the bottom of pot 50 for permitting water to escape pot 50 and drain into saucer 70 where the water can be tested. Pot stand 10 is configured such that saucer 70 can be removed and replaced without physically moving pot 50. Pot stand 10 is exemplary; a number of similar embodiments including squared or straight support members located at different locations around the platforms, flat platforms, of different drainage patterns are envisioned, and the disclosure is not intended to be limited to the particular examples provided. Drips 71 are illustrated falling from platform 20 into saucer 70 and forming pooled water 72. In another embodiment, platform 20 can be suspended over a saucer 70 that simply rests on the ground, and legs can be substituted for supporting members 40 and 42.

Figure 2:
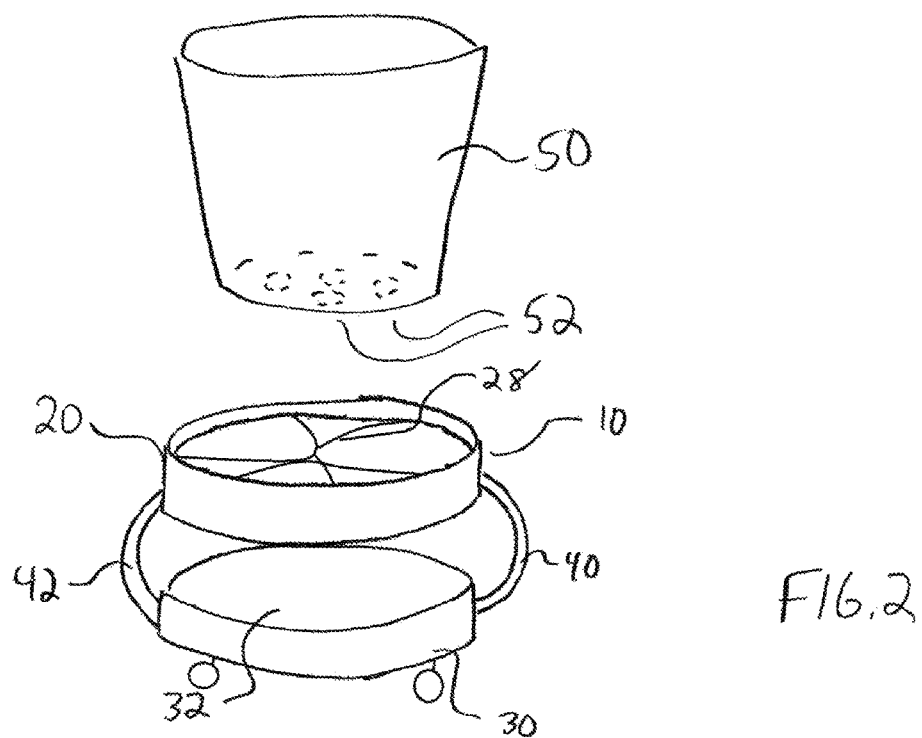
FIG. 2 illustrates the pot stand of FIG. 1 with the pot lifted from the pot stand and the saucer removed, in accordance with the present disclosure.

FIG. 2 illustrates the pot stand of FIG. 1 with the pot lifted from the pot stand and the saucer removed. Pot stand 10 is illustrated including first platform 20, second platform 30, support members 40 and 42 and pot 50. Pot 50 includes exemplary holes 52 illustrated upon a bottom face of pot 50. Platform 20 includes support bar pattern 28 configured to hold pot 50, for example, including welded wire sections with wide gaps between the bars permitting water to drain into a saucer located therebelow on platform 30 without touching the bars and changing the chemical properties of the water. In this way, a user can test water collecting in the saucer to accurately diagnose conditions in the soil in pot 50. Exemplary platform 30 includes flush flat surface 32 for holding a saucer in place. In other embodiments, platform 30 can include a cylindrical outer wall with a platform surface within the outer wall and with holes or other features configured to permit any water missing the saucer placed thereupon to drain through to the floor. Bars used in pattern 28 and other portions of the pot stand can include non-reactive materials or can be coated with a non-reactive material to avoid corrosion and contamination in applications where testing the runoff water is critical. In some embodiments, portions of or the entire pot stand can be constructed of a non-reactive polymer such as polypropylene or acrylonitrile butadiene styrene (ABS).

Support members 40 and 42 can be located at various points around the first and second platforms. In one embodiment, as viewed from above the pot stand, the support members can be placed at zero, ninety, and one hundred eighty degree points around circular platforms, with no support member placed at two hundred seventy degrees to permit the saucer to be placed and moved freely. In another embodiment, one or two support members can be provided, with the support member or members being sized appropriately to robustly hold the first platform above the second platform. In any embodiment of the disclosure, the runoff collection container or saucer is able to be easily removed from the pot stand without disturbing the potted plant.

Figure 6:
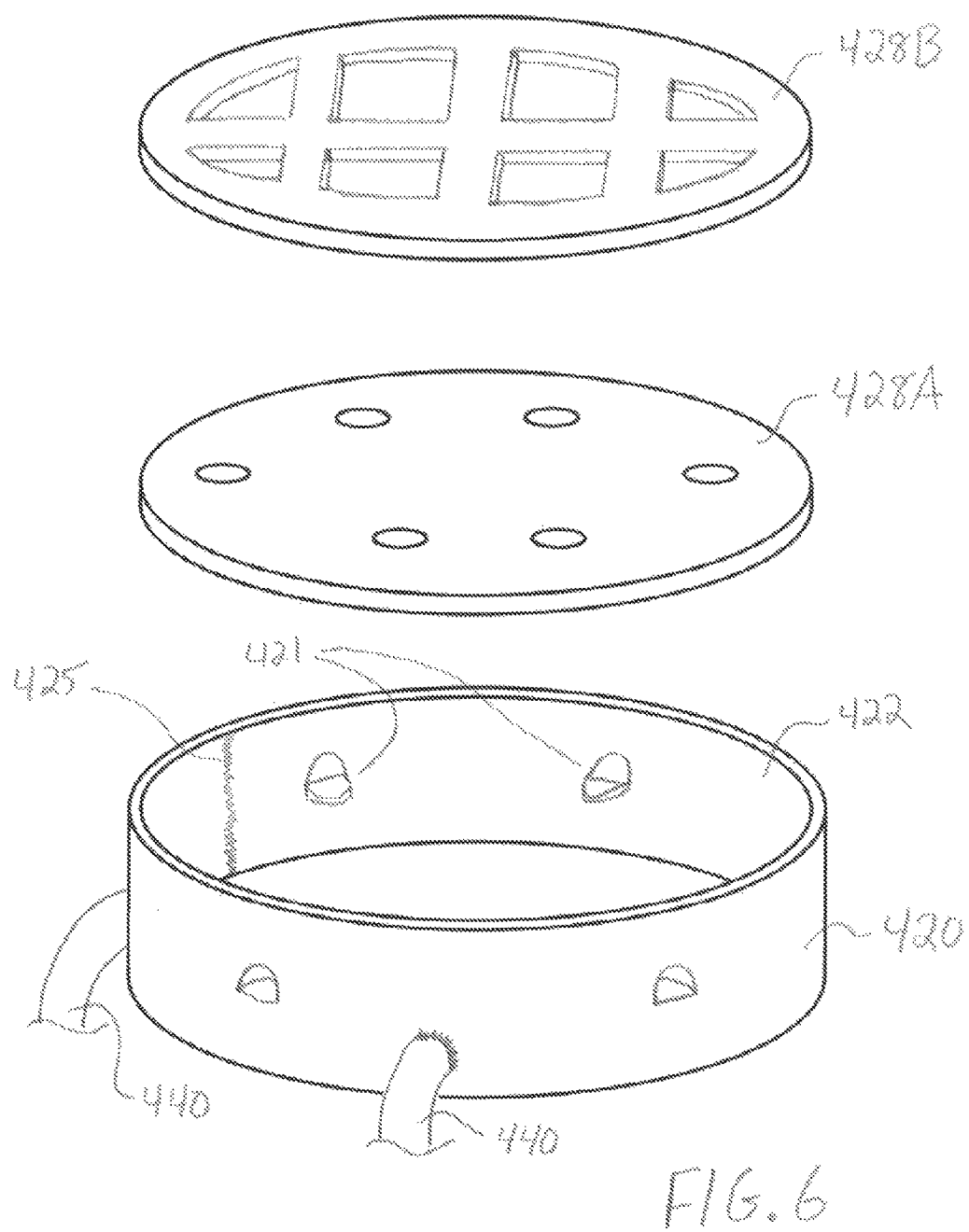
FIG. 6 illustrates an exemplary first platform comprising an outer wall with projecting tabs configured to receive a plurality of alternative platform surfaces to hold a pot, in accordance with the present disclosure.

The bar pattern 28 is exemplary. In other embodiments, bars can be parallel bars spaced apart and welded at the sides to the outer wall. In another embodiment, the bars can be a thin mesh of bars arranged in a mesh pattern. In an injection molded application, the bars can be a molded cross-hatched pattern with reinforcing ribs extending vertically under the pattern. FIG. 6 illustrates an exemplary first platform comprising an outer wall with projecting tabs configured to receive a plurality of alternative platform surfaces to hold a pot. First platform 420 is illustrated including cylindrically shaped outer wall 422, supporting members 440 welded thereto, and a plurality of alternative platform surfaces 428A and 428B, each configured to rest upon supporting tabs 421 punched out of outer wall 422. Weld seam 425 illustrates one configuration of outer wall 422 where a long rectangular metallic piece is bent into a circle and the ends are welded together to form a cylinder. Tabs 421 can be punched out of the outer wall material to create features for the platform surfaces to rest upon. Platform surface 428A is provided as a metallic plate with holes drilled therethrough. Platform surface 428B is provided as an injection molded part with a grid formed thereupon. Either of the platform surfaces can be placed within the outer wall 422 and set upon tabs 421. Depending upon the particular desired use of the pot stand, a person can select between the platform surfaces for use with the pot stand.

The first and second platforms disclosed herein are illustrated as circular or cylindrical. They can alternatively be square, triangular, or any other shape.

Figure 3:
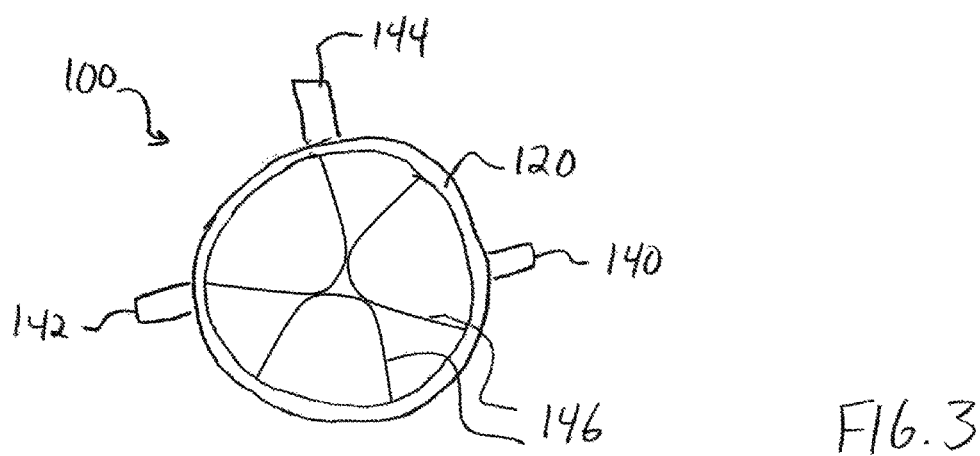
FIG. 3 illustrates an exemplary alternative embodiment of a pot stand, in accordance with the present disclosure.

FIG. 3 illustrates an exemplary alternative embodiment of a pot stand. Pot stand 100 is illustrated including platform 120, supporting member 140, 142, and 144. Bars 146 are configured to hold a pot upon platform 120, wherein water from the pot can drain directly past bars 146 without touching the bars.

Figure 4:
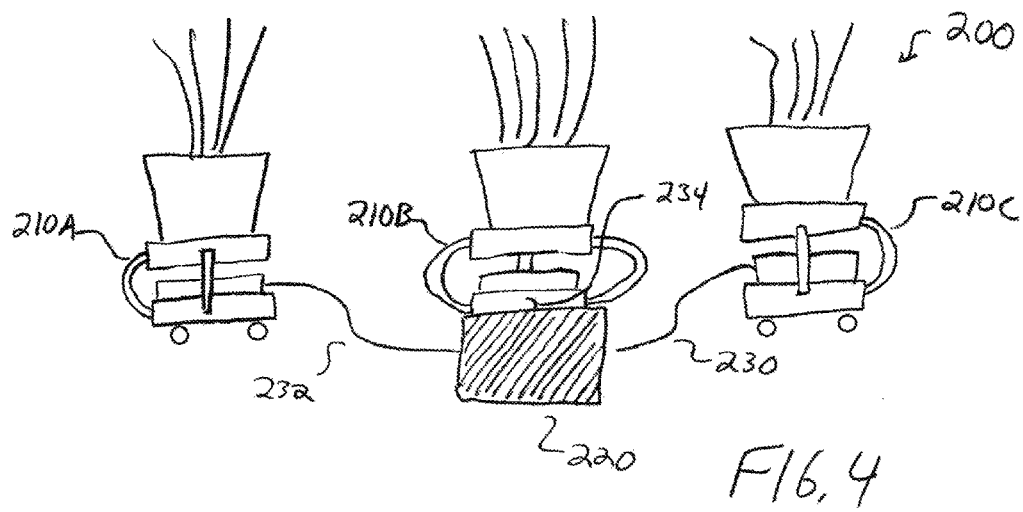
FIG. 4 illustrates an exemplary embodiment including three pot stands, wherein each saucer for each pot stand includes a tube draining water from saucers to a pump for flushing purposes, in accordance with the present disclosure.

FIG. 4 illustrates an exemplary embodiment including three pot stands, wherein each saucer for each pot stand includes a tube draining water from saucers into a drain pan. Three pot stands 210A, 210B, and 210C are illustrated each holding a saucer. Each saucer is equipped with a drain tube 232, 234, and 230, respectively, permitting water to drain from the saucers into drain pan 220. This water can be tested in drain pan 220, drained or pumped into a waste receptacle, or recycled for another application to the plants. This configuration is useful for flushing purposes when a significant volume of water is flushed through one or more of the pots. The elevated platforms provide an ability to flush one or more of the plants without physically lifting the pots. In one embodiment, the drain tubes are located above a bottom of each of the respective saucers, so that a small amount of water is always left in each saucer for testing while the majority of the runoff in each saucer flows into the drain pan 220.

Figure 5:
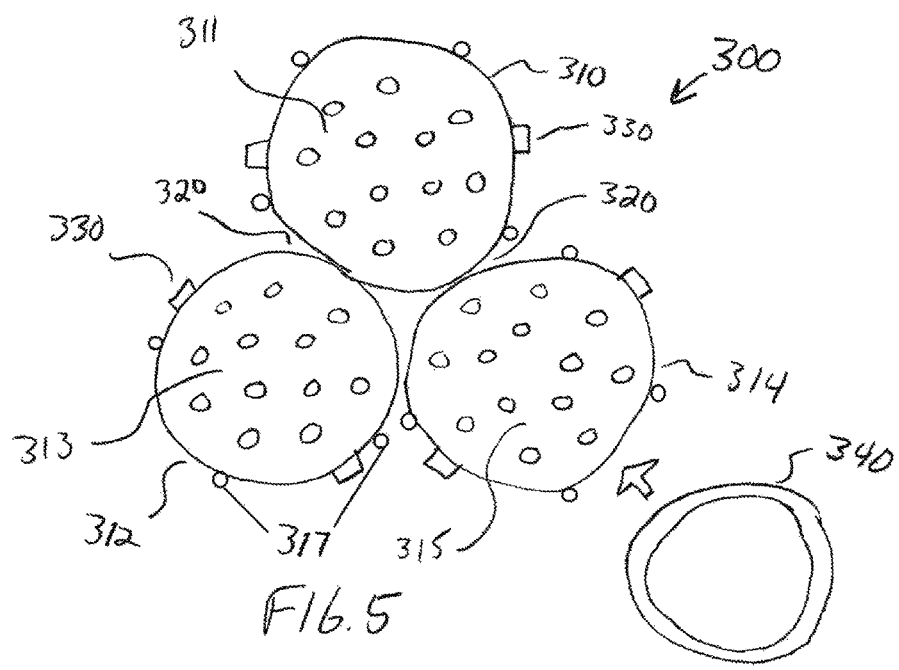
FIG. 5 illustrates an exemplary embodiment of a pot stand including three stand sections together, each stand section capable of holding a pot and each stand section capable of receiving a saucer under each of the pots, in accordance with the present disclosure.

FIG. 5 illustrates an exemplary embodiment of a pot stand including three stand sections connected together, each stand section capable of holding a pot and each stand section capable of receiving a saucer under each of the pots. Pot stand configuration 300 includes three platforms 310, 312, and 314, each configured to accept a pot upon platform faces 311, 313, and 315 respectively. Platform faces 311, 313 and 315 include holes to permit water to drain from each face to the saucer below. This configuration including platforms with holes can be replaced by bent bars such as is illustrated in FIG. 3, but is provided as a non-limiting example of how the disclosed platforms can be alternatively configured. In some embodiments where the chemistry of the water being flushed through the plants is important for testing purposes, the platforms can be made of non-reactive materials to prevent the properties of the water from being altered by contact with the platform faces. Each platform 310, 312, and 314 is suspended over another platform therebelow accepting a saucer 340. Support legs 330 are illustrated affixed to each of the platforms, for example, by welded joints. Similarly, each of the platforms 310, 312, and 314 are affixed at joints 320 to neighboring platforms. The platforms each include stake guides 317 located exterior to the platforms. These guides 317 permit one to securely locate stakes to configuration 300, for example, to suspend tomato plants or to give bean plants a lattice upon which to grow without the stakes invasively being pressed into the soil around the plants. Three platforms are illustrated in FIG. 5. A number of different configurations and shapes with attached platforms holding pots are envisioned, and the disclosure is not intended to be limited to the particular examples provided herein.

The platforms upon which the potted plant rests can take the form of the bar patterns of FIG. 2, a flat plate with holes provided thereupon of FIG. 5, or any of a number of other patterns that provide support to the potted plant while letting runoff water flow to the runoff collection container below.

Embodiments of the pot stand are illustrated including distinct supporting members embodied as bent rods holding the first platform above the second platform. It will be appreciated that a single wall member or a plurality of wall members could be used in place of the distinct supporting members in accordance with the present disclosure.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device comprising a pot stand configured to hold a plant within a pot, comprising:

a first platform configured to hold the pot and to permit runoff water from the pot to drain through the first platform; and a second platform rigidly attached below the first platform holding a removable runoff collection container collecting water from the first platform, wherein the runoff collection container is removable without moving the pot;

wherein the first platform comprises a cylindrical outer wall;

wherein the outer wall comprises tabs projecting inwardly from the outer wall; and wherein the first platform further comprises a removable platform surface resting upon tabs.

2. The device of claim 1, further comprising at least one stake guide attached an outer perimeter of the device.

* * * * *